July 7, 1970     R. L. GAMBLIN ET AL     3,519,953
HIGH SPEED SCANLASER

Filed April 28, 1967     2 Sheets-Sheet 1

INVENTORS.
RODGER L. GAMBLIN
DAVID D. ROSHON

BY    AGENT

United States Patent Office 3,519,953
Patented July 7, 1970

3,519,953
HIGH SPEED SCANLASER
Rodger L. Gamblin, Vestal, and David D. Roshon, Binghamton, N.Y., assignors to International Business Machines Corporation, Armonk, N.Y., a corporation of New York
Filed Apr. 28, 1967, Ser. No. 634,702
Int. Cl. H01s *3/00*
U.S. Cl. 331—94.5      3 Claims

ABSTRACT OF THE DISCLOSURE

The invention relates to a scanlaser and particularly to a digital scanlaser coupled to an input laser as a means for reducing the switching time of the digital scanlaser.

BACKGROUND

The application of lasers to computing systems has not advanced much beyond experimental attempts owing to the complexity of the optical scanning systems required externally of the laser resonant cavity. The advent of the scanlaser, which is a relatively recent innovation, has been considered to be more attractive to the computer art especially in the design and fabrication of laser type memories. The scanlaser, particularly the digital scanlaser, has the advantage of mode selection completely within the lasing cavity and as such the scanning capability of the laser beam makes it highly desirable for scanning memories which employ holograms that inherently have extremely high volumetric efficiencies. In spite of this advantage, the digital scanlaser has an inherently slow speed of mode selection.

SUMMARY

The present invention is thus directed to a digital scanlaser disposed in cooperative relation with an input laser whose output serves as the input to the digital scanlaser to provide an increase in the energy density of unselected modes. By means of suitable mode selection apparatus, to be later described, the digital scanlaser selectively switches from one mode to any other mode in a time interval much shorter than that required for mode switching in scanlasers of the prior art. Since the initial energy, that is the photon density, of a selected mode in the prior art scanlaser is relatively low at the time of initial selection, a considerable delay is experienced from the time of selection to the time when sufficient amplification is realized to yield lasing of the selected mode.

In the present invention the input lasing system provides the digital scanlaser with an input whose energy density is well above that of an initially selected mode in the prior art scanlaser.

It is therefore the principal object of the present invention to increase the scanning speed of a digital scanlaser.

Another object is to improve the memory capabilities of computers.

A more specific object is in the provision of a digital scanlaser cooperating with a multimode lasing cavity to enhance the scanning speed of the digital scanlaser.

DESCRIPTION OF PREFERRED EMBODIMENT

Figure 1:
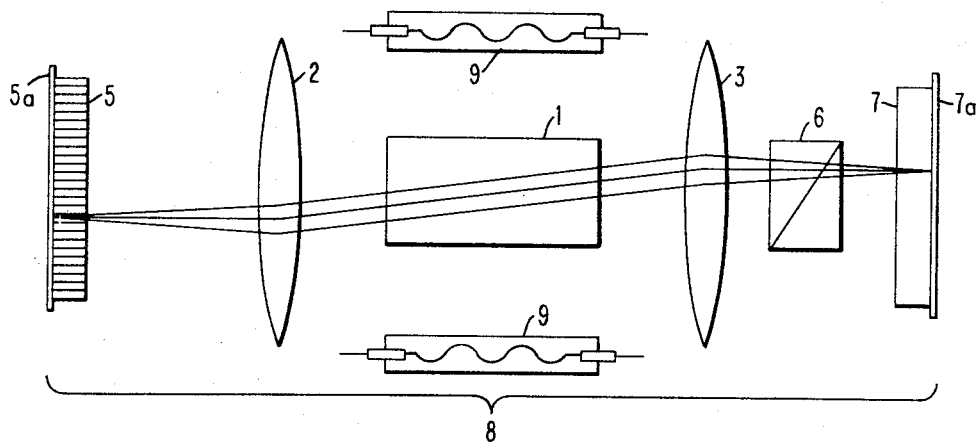
FIG. 1 is a schematic showing of the digital scanlaser.

Before describing the input laser, a description of the digital scanlaser will first be presented as a basis for understanding the invention as a whole. Referring to FIG. 1, the digital scanlaser comprises an activatable member 1 interposed between convex lenses 2 and 3. To the left of lens 2 is a mode selection switch 5 having a surface 5a which is highly reflective, typically 99.75%. To the right of lens 3 are a polarizer 6 and a mode selection switch 7 having a surface 7a which is about 95% reflective and about 5% transmitting to provide a useful output beam. A pump 9 provides optical pumping for the medium 1, the entire structure constituting the resonant cavity 8. The polarizer 6 allows the laser to oscillate only for light polarized in the direction transmitted by the polarizer.

Figure 2A:
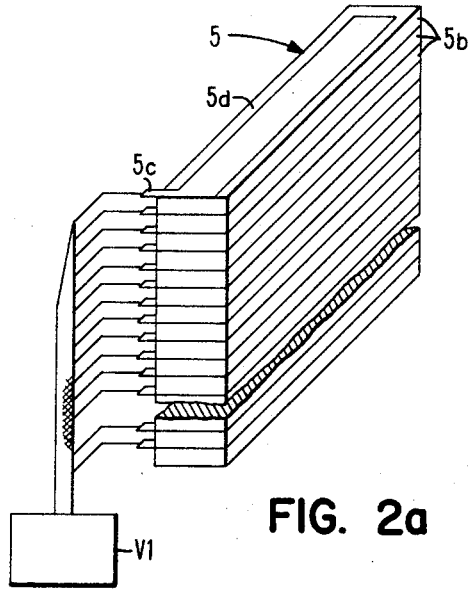
FIGS. 2a and 2b show details of mode selecting means.
Figure 2B:
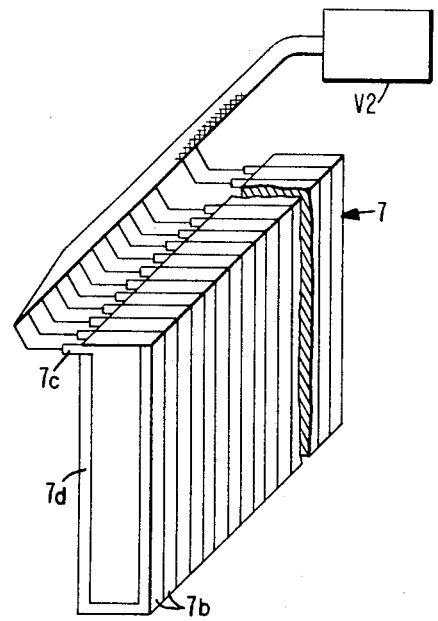

The mechanism for selecting any one mode of the plurality of spatial modes is under control of the mode selectors 5 and 7, details of which are shown respectively in FIGS. 2a and 2b. In FIG. 2a the mode selector is comprised of a stack of electro-optic crystals 5b in the form of horizontally disposed laminations constituted of a material such as lithium tantalate, lithium niobate or KDP which are stressed under the influence of an electrical force to cause the material to exhibit birefringent characteristics. The electrical force is applied to terminals 5c connected to electrodes 5d secured around the periphery of adjacent surfaces of the crystals 5b. The mode selector 7 is shown in FIG. 2b and is similar in structure to the selector 5 having corresponding portions appropriately referenced 7b, 7c and 7d. As seen in FIG. 1, the selectors 5 and 7 are oriented at 90° relative to each other.

As mentioned above, the digital scanlaser has a plurality of spatially separate modes of operation, each mode being selected by an appropriate voltage derived from an appropriate supply V1, V2 applied to selected adjacent terminals on each of the mode selectors 5 and 7. In the exemplary embodiment of FIG. 1 each mode selector consists of 32 crystals to enable 1024 possible output beam positions. The mode selection is relatively slow requiring from between 300 to 1000 nanoseconds. The slowness is due primarily to the low energy density present at the time of initial selection.

The operation of the digital scanlaser is as follows: Initially an electrical bias is applied to all terminals 5c, 7c of the selectors 5 and 7 to introduce birefringence. Proceeding on the assumption that light originates at the left end of the laser medium 1 and then travels to the right, the light in passing through the medium 1 is amplified by stimulated emission and proceeds through the lens 3 and polarizer 6 where the beam becomes plane polarized. In passing through any of the electro-optic crystals exhibiting birefringence the plane polarized light is elliptically polarized by the selector 7, then reflected by mirror surface 7a and returns through the electro-optic crystals in the selector 7 which induces further ellipticity. Upon returning through the polarizer 6, the component of light normal to the polarization plane is not transmitted thus resulting in loss of beam energy. In proceeding to the left the attenuated beam passes through the active medium 1 and is again amplified and passes through the lens 2 and through the selector 5, and then reflected by mirror surface 5a and returns through the selector becoming elliptically polarized. After further amplification by the medium 1, the elliptically polarized beam again arrives, by way of the lens 3 to the polarizer 6 in which the beam suffers further losses in transmission. It can be appreciated that if the losses introduced by the mode selectors 5 and 7 exceed the gain of the laser medium 1 in the above process, the beam intensity will not be amplified and no laser oscillations will occur in any mode. If the electrical bias is now removed from the selective optic crystals on each of the selectors 5 and 7 a discrete spatial path will exist where no birefringent ellipticity is induced and hence no losses will result. Under this condition and for this unique discrete path a positive gain exists to cause laser oscillations to build up to yield a useful output beam along the unique direction established by the selected electro-optic elements in both of the mode selectors 5 and 7. In order to cause the beam to switch to another mode, the previously removed bias is reapplied and the bias is removed from a desired pair of electro-optic elements of the selectors 5 and 7 to cause a re-orientation of the beam direction.

Figure 4:
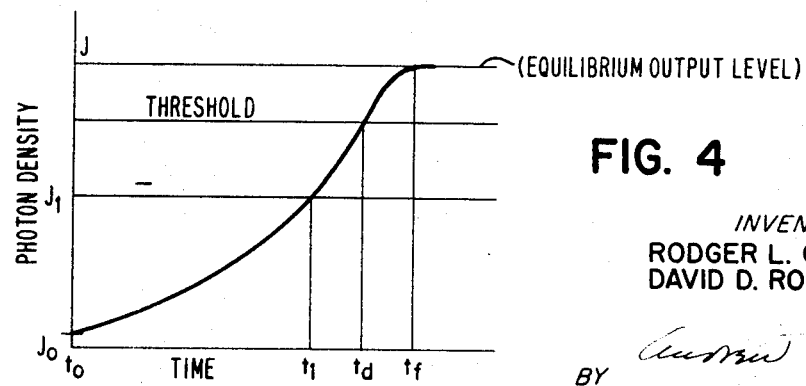
FIG. 4 is a plot of photon density against time.

The switching on of a scanlaser mode occurs in two stages, as illustrated in FIG. 4, wherein photon density (or beam intensity) is plotted against time. Initially, the number of photons in a mode is very small, shown by $J_o$. At time $t_o$, the particular mode is switched "on," by removing the bias from the appropriate electro-optic element of the mode selectors 5 and 7. The photon density increases rather slowly until the laser threshold is reached at time $t_d$ (the delay time). In the time interval from $t_d$ to $t_f$ the laser output builds up more rapidly to its equilibrium output level. The interval from $t_d$ to $t_f$ is on the order of 30 times smaller than the interval from $t_o$ to $t_d$.

The basic reason for the relatively long time required to establish a new mode in the scanlaser is the low energy existent in this mode at the start. The photon density is then at the spontaneous emission level. In the laser cavity, when a mode is selected, a light ray traveling through the active laser medium and returning to its starting point will be amplified by a factor of $(1+\alpha)$, wherein $\alpha$ is a number on the order of 0.1. The time taken for this round trip is on the order of 2 nanoseconds for a typical scanlaser resonator. If we consider the buildup of a mode in the laser as a function of time, we find that:

$$J = J_o(1+\alpha)^n \quad (1)$$

where J is the output after $n$ passes and $J_o$ is the initial power level. It can be shown that $J_o$ is on the order of $10^{-7}$ watts, while J may be typically 50 watts. Dividing Equation 1 by $J_o$, taking the logarithm and simplifying using the relation that $I_n(1+\alpha) \approx \alpha$ and $\alpha \ll 1$ that:

$$n \approx \frac{2.303}{\alpha} \log_{10} \frac{J}{J_o} \quad (2)$$

For the quantities discussed above, $n=200$, so that the required time is on the order of 400 nanoseconds. Should the gain, $\alpha$, be only .05, the time would be about 800 nanoseconds.

The present invention is directed to a means of reducing the delay time $t_d$ by raising the photon density in all modes from $J_o$ to a high value $J_1$ (FIG. 4). Thus when switching on any given mode, the time interval required to reach the lasing threshold is only $(t_d-t_1)$ instead of $(t_d-t_o)$.

Figure 3:
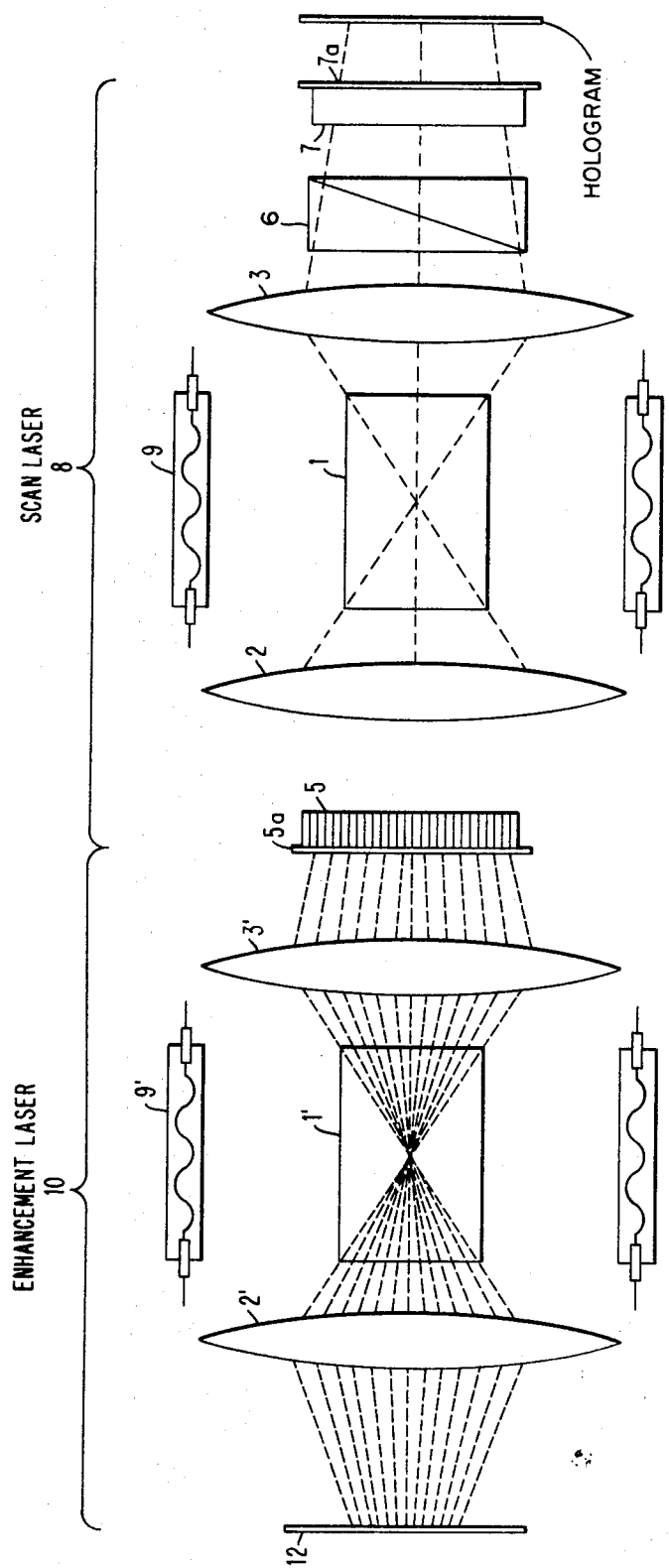
FIG. 3 is an over-all view of the invention showing the combination of an input laser and the digital scanlaser.

This is accomplished, as shown in FIG. 3, by coupling a second laser 10 to the scanlaser 8 by way of mirror 5a, which is common to both lasers. Corresponding elements in the laser 10 have the same reference except that they are primed. Mirror 5a is altered to have a transmission on the order of 5%, allowing energy to flow into the scanlaser cavity from the "enhancement" laser 10, and that energy flowing out of the scanlaser 8 into the enhancement laser 10 can be amplified by the latter and returned to the scanlaser 8. The enhancement laser 10 is essentially identical to the scanlaser, except for the absence of the mode selectors and polarizer which provide for a wide aperture thereby enabling all modes to operate simultaneously. Mirror 12 is highly reflective, typically 99.75%. The total energy output of this second laser 10 can easily yield on the order of 10 watts with reasonable input power. This energy, divided between the 1024 possible modes of the scanlaser, delivers about 10 milliwatts into each mode. The loss in a nonenergized mode is on the order of .05 per pass so that each mode contains some 0.2 watts of power. In Equation 2, $J/J_o$ would then become 250, and for an $\alpha$ of 0.1 in the selected mode, one would obtain 110 nanoseconds for $t_d$, compared to 400 nanoseconds, the speed of the prior art scanlaser.

By virtue of the high speed in laser mode selection, the invention is highly adaptable to scan computer memories of the type employing holograms, schematically shown in FIG. 3, having inherently high data densities.

Although the illustrative embodiment utilizes a particular kind of digital scanlaser, other types can be suitably employed. There is, for example, a system in which the resonant cavity is angularly degenerate and the mode selection is achieved by lifting the degeneracy for the desired mode. The invention can also employ a class of lasers characterized by what is termed conjugate laser resonators which achieve mode selection through dynamic spatial filtering under control of a digital or analog selection system.

What is claimed is:
1. A high speed scanlaser system comprising:
   first and second scanlasers, each having a resonant cavity containing a pumping source, a lasing element and a lens disposed on either end of said element and in axial alignment therewith;
   a fully reflective mirror disposed at one end of the cavity of said first laser;
   an output mirror disposed at the output end of the cavity of said second laser;
   a polarizer disposed within the cavity of said second laser and in proximity to said output mirror and in axial alignment with the lasing element;
   a highly reflective, but partially transmissive, mirror disposed between the cavities of said lasers to enable the establishment of lasing communications therebetween;
   said first laser being in constant operation to provide light oscillations concurrently in a plurality of differential spatial lasing modes;
   mode selection means disposed in the cavity of said second laser, and
   voltage selection control means for activating said mode selection means to enable any desired lasing mode of light oscillations in said first laser to enhance the initiation of lasing action of a desired spatial mode in said second scanlaser.

2. A system as in claim 1 further characterized by the provision of a hologram containing discrete areas of stored data including means for positioning said hologram, within the scanning capabilities of said second scanlaser, such that discrete areas thereof may be selectively influenced by said different spatial modes of light oscillations.

3. A system as in claim 1 in which said mode selection means is normally biased electrically to inhibit lasing action in the second laser, and said voltage selection control means selectively removes the bias to enable the enhancement of lasing action in said second scanlaser under control of a desired lasing mode of light oscillations communicated from said first laser.

References Cited

UNITED STATES PATENTS 3,242,440  3/1966  Koester et al. _____ 331—94.5

OTHER REFERENCES

"Two-Dimensional Scan Laser" R. L. Garwin, IBM Tech. Disc. Bltn. vol. 8, No. 11, April 1966 pp. 1555–6.

"Optical Compensation of Matrix Controlled Scan Laser," W. V. Smith, IBM Tech Disc. Bltn., vol. 8, No. 12, May 1966, pp. 1783–4.

RONALD L WIBERT, Primary Examiner

P. K. GODWIN, JR., Assistant Examiner

U.S. Cl. X.R

350—160